United States Patent [19]

Ryan

[11] Patent Number: 4,530,095
[45] Date of Patent: Jul. 16, 1985

[54] COMPARISON OF DIGITAL BIT STREAMS USING MODIFIED PARITY

[75] Inventor: Clarke S. Ryan, Red Bank, N.J.

[73] Assignee: AT&T Bell Laboratories, Murray Hill, N.J.

[21] Appl. No.: 473,665

[22] Filed: Mar. 9, 1983

[51] Int. Cl.³ .................................... G06F 11/12
[52] U.S. Cl. ................................ 371/49; 371/67
[58] Field of Search ............... 371/49, 43, 51, 67

[56] References Cited

U.S. PATENT DOCUMENTS

| 4,291,408 | 9/1981 | Ogawa | 371/49 |
| 4,317,202 | 2/1982 | Markwitz | 371/43 |
| 4,321,704 | 3/1982 | Lemoine | 371/51 |
| 4,412,329 | 10/1983 | Yarborough | 371/49 |
| 4,464,752 | 8/1984 | Schroeder et al. | 371/51 |

Primary Examiner—Jerry Smith
Assistant Examiner—Michael R. Fleming
Attorney, Agent, or Firm—Thomas Stafford

[57] ABSTRACT

A modified parity calculation technique is presented which obviates the conventional requirement of deterministically inserting markers into a bit stream of data. The advantages of the present technique are fully realized in applications for in-service monitoring of extremely high speed bit streams of data. A bit pattern, or template, is compared to the content of the bit stream to detect matches between the two. The matches determine bit spans on which the parity calculation is performed. Since the parity signal is highly compressed and low speed relative to the data, it can be readily delayed to facilitate confirmation of identical content of two high speed bit streams which differ substantially in relative timing.

4 Claims, 4 Drawing Figures

COMPARISON OF DIGITAL BIT STREAMS USING MODIFIED PARITY

BACKGROUND OF THE INVENTION

This invention relates to digital monitoring techniques. More particularly, the invention relates to a modified statistical parity calculation technique affording significant bit rate reduction through data compression without the usual requirement of deterministically altering a pre-existing bit stream.

A useful testing function in digital data communications is the ability to verify that two data streams are identical when they contain the same information while only differing in phase or absolute timing. Such a test readily confirms proper operation of digital transmission equipment. Conventionally, a bit by bit comparison technique was used wherein a variable length digital delay is appropriately adjusted to obtain phase synchronization of the signals before application to an exclusive OR gate. The output of the exclusive OR gate then indicates discrepancies or bit errors between the two digital bit stream signals.

Increases in the capacity of sophisticated digital communications systems by utilization of higher bit rates has rendered conventional error monitoring techniques much more difficult in a number of ways. Namely, the requirements of the variable delay are made more difficult since it must operate at the same high speed clock rate as the data signal. The capacity of the variable delay must also be able to compensate for the delay experienced in the system under test.

It often is required to include the transmission medium as a necessary component of the portion of the system under test. In a typical transmission system many miles of transmission medium must be included. For example, 500 miles of transmission cable is not unusual. At a data rate of 139 MBS, the variable delay required for monitoring of such a transmission system must accommodate 10,000 bits or time slots. The combination of these constraints severely limits the speed and size of the system capable of being tested by conventional error monitoring techniques.

SUMMARY OF THE INVENTION

Broadly, the invention takes the form of a modified parity technique which allows the equivalent of bit by bit comparison of two digital bit streams without requiring any modification of the bit streams.

An aspect of the invention is the utilization of an N bit template which is continuously compared to the digital bit stream for defining the bit spans over which successive parity calculations are performed related to the occurences of the N bit template. The result of the parity calculation is compared to another parity bit calculation on a digital bit stream often performed at another point in the system. Since the calculated parity sequence is a highly compressed form of informational signal and yet dependent on the total bit content of the digital bit stream from which it was generated, the size of the variable delay for synchronizing the parity calculations is significantly reduced over that required for conventional bit by bit comparison techniques. Advantageously, the speed at which the variable delay must operate is significantly reduced. The length of the N bit template may be varied as well as its content to provide programmable control for adaption to any random or nonrandom data stream.

BRIEF DESCRIPTION OF THE DRAWING

Additional features of the invention and objects of the invention will be more readily appreciated and better understood by references to the following detailed description which should be considered in combination with the drawings.

DETAILED DESCRIPTION

Figure 1:
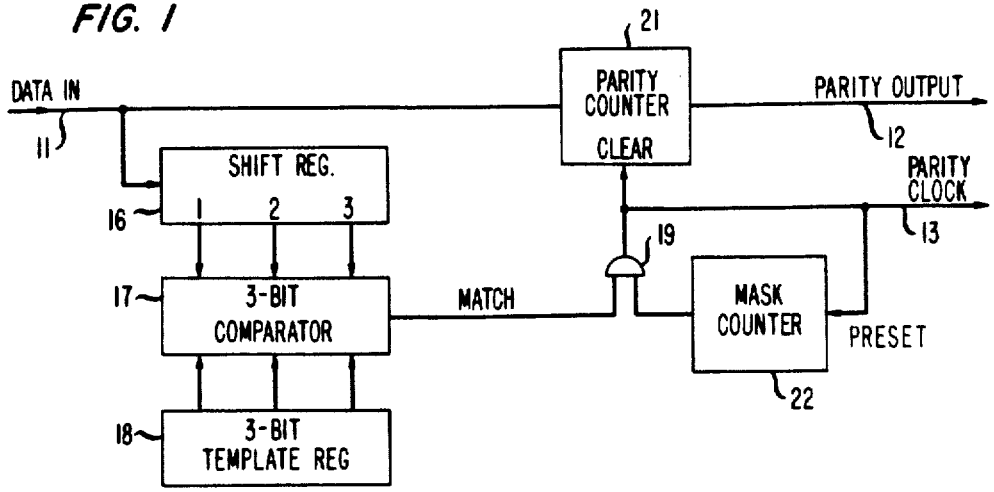
FIG. 1 is a block diagram for illustrating the inventive parity calculator.

FIG. 1 is a block diagram for providing a parity calculation typically from data in the form of a high speed bit stream presented at terminal 11. The circuit of FIG. 1 provides an ODD/EVEN parity count output on terminal 12 and a parity clock output on terminal 13. As the data in the input bit stream appears on terminal 11, it is read into 3-bit shift register 16. Shift register 16 accordingly produces a parallel output indicative of its content to comparator 17. Of course, the content corresponds to a sequence of the predetermined number of successive bits in the input bit stream. The other input to comparator 17 is the content of register 18 which corresponds to a predetermined bit pattern which occurs randomly and repetitiously in the input bit stream. Therefore, comparator 17 produces a match output which is presented to AND gate 19. The output of AND gate 19 produces a clearing pulse for parity counter 21.

Thus the basic function of the circuitry described so far is to provide randomly spaced intervals dependent upon the data content in the input bit stream. This establishes intervals over which a parity calculation may be made. In the event that the template bit pattern occurs almost successively within the input bit stream, mask counter 22 provides a predetermined set counter which prevents the circuit of FIG. 1 responding to the match output of comparator 17 too frequently. Specifically, the output of mask counter 22 stays low for a predetermined interval after a parity count is started to prevent a matched output from comparator 17 from clearing counter 21 through AND gate 19.

Figure 2:
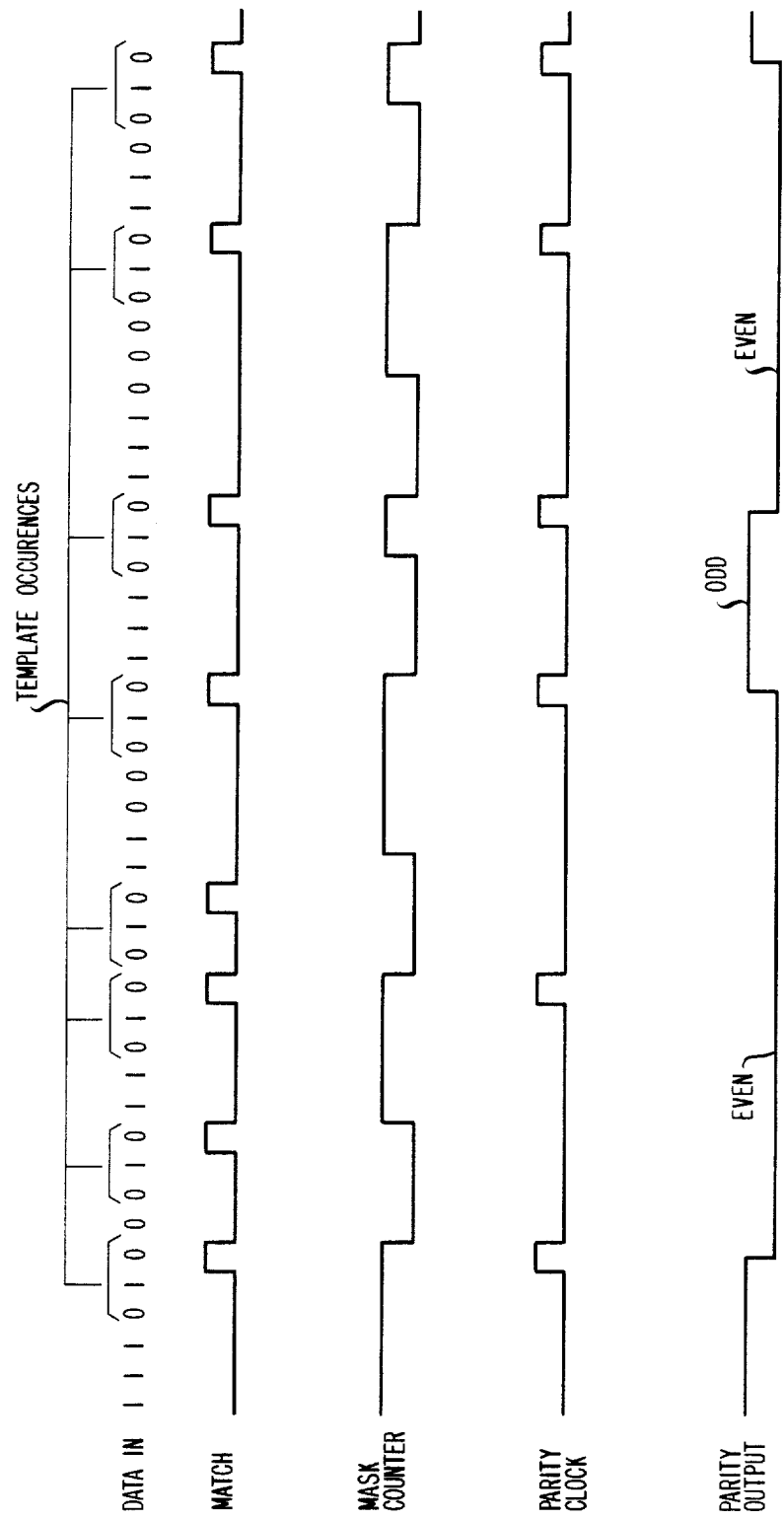
FIG. 2 is a timing signal diagram for illustrating the operation of the arrangement of FIG. 1.

FIG. 2 is a timing diagram for illustrating the operation of the circuit of FIG. 1 more clearly. The data of an input bit stream is indicated by a pattern of successive ones and zeroes wherein a template or predetermined bit pattern occurs randomly. In FIG. 2, this is labeled as data in. In accordance with the operation of comparator 17 and registers 16 and 18 each time a template occurs in the input bit stream, the comparator produces a match pulse output. When a match output pulse occurs, mask counter 22 whose output is also shown in FIG. 2, goes low for a preset count.

In the event that another match occurs while the output of mask counter 22 is low, AND gate 19 inhibits the match pulse from appearing at counter 22. The output of AND gate 19 is the parity clock signal in FIG. 2. As can be observed from FIG. 2, this typically occurs when the template pattern appearances in the input bit stream are spaced close together. Accordingly only selected outputs are allowed to appear at terminal 13 along with the parity count output on terminal 12. Another way of looking at the output of FIG. 1 is that the parity clock serves as a read pulse which instructs the circuitry responsive to this output to look for a possible transition appearing in the parity output at terminal 12.

Although the circuit of FIG. 1 and the timing diagram of FIG. 2 clearly illustrate the fundamental principles of the invention, it is to be understood that those skilled in the art may desire to chose a template containing greater than three bits. The use of this template (3-bit pattern) was selected to provide a timing diagram which is both meaningful and easy to follow.

Figure 3:
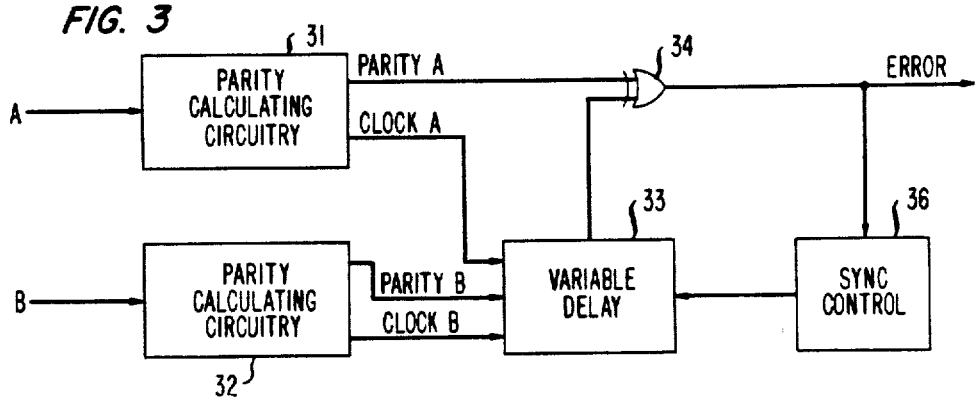
FIG. 3 is an application of the invention for comparing two high-speed bit streams.

FIG. 3 provides an arrangement for comparing input bit streams A and B wherein the circuit of FIG. 1 is used within blocks 31 and 32. Nominally, the two bit streams are identical but are displaced in time which usually is the result of a difference in propagation or transmission delay. Parity A signal from parity calculating circuitry 31 is supplied to one input of Exclusive OR gate 34 while the clock A signal is supplied to variable delay 33. The parity B signal and clock B signal from parity calculating circuitry 32 are also supplied to variable delay 33. A delayed version of the parity B signal is supplied from delay 33 to the other input of Exclusive OR gate 33. Exclusive OR gate 34 produces an error signal whenever the two parity signals do not agree. The error signal is applied to synchronization control 36. The output of synchronization control 36 adjusts the number of time slots of delay inserted by the variable delay 33 to compensate for the relative difference in timing between input bit streams A and B.

After compensation is provided for the difference in delay, exclusive OR gate 34 only produces an output when the two parity signals are not identical. This output therefore indicates that there is a difference in the bit content of input bit streams A and B. A significant feature utilized in the circuit of FIG. 3 is that the parity signals provide a low speed informational signal dependent upon the entire bit content of the input bit streams. Therefore components 33, 34 and 36 in FIG. 3 operate at a much lower speed than the input bit stream data rate. The function of mask counter 22 of FIG. 1 is to provide an upper limit of the speed requirement of variable delay 33 in FIG. 2. Also the required delay capacity in variable delay 33 is significantly reduced in that a small number of time slots of delay between the two parity signals is equivalent to a much larger number of time slots between the two actual input bit streams.

Figure 4:
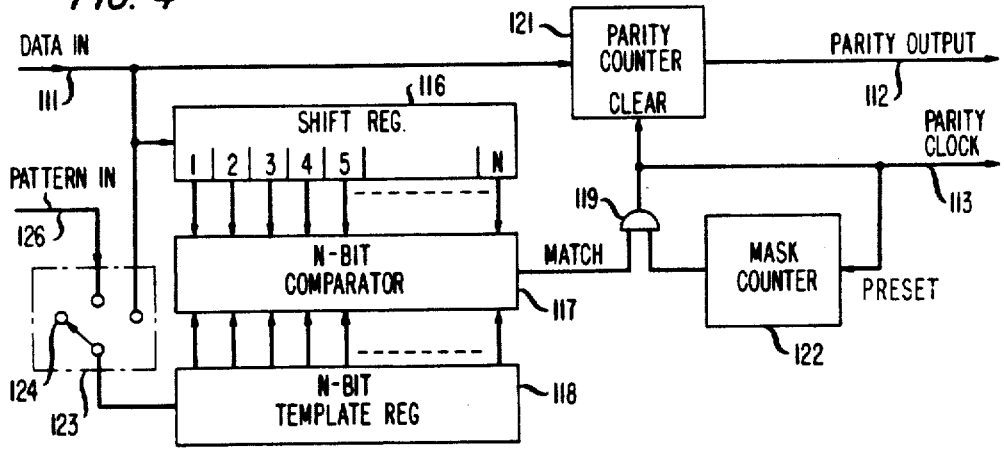
FIG. 4 illustrates the expansion of the template.

FIG. 4 is an arrangement wherein N bits are used in the template. Reference numerals incremented by one hundred over those in FIG. 1 are used to designate components in FIG. 4, similar in construction and function. Since a larger template is used, the number of template occurrences will be less frequent statistically and spaced further apart. The advantage of a larger template is that its utilization provides greater bit compression and further reduces the requirements of the variable delay used in applications such as depicted in FIG. 3.

An optional feature in FIG. 4 concerns the manner in which the content of the N-bit pattern is determined. Template register 118 is loaded via switch 123. When the rotor of switch 123 corresponds to position 124, the present content in register 118 is maintained. To change the content of register 118, switch 123 selects either terminal 126 or terminal 111. The signal applied to terminal 126 may be predetermined or generated randomly by a suitable source. Alternatively, a portion of the data input may be selected by switch 123 with the reasonable expectation that any pattern of bits which occurs in the data will be repeated.

In either case, it should be understood that the same template pattern is to be used whenever parity calculations are to be compared for verifying identical bit content in data streams. For example, in the circuit of FIG. 3 an arrangement (not shown) for applying the same selected template pattern for both parity calculating circuits 31 and 32 is utilized.

In order to make an intelligent choice of the appropriate parameters for a modified parity check, some relationships between the length of the pattern and pattern occurrences are required. Let E(BITS) represent the expected number of bits required to find the occurrence of an N-bit pattern. This is determined by $$E(\text{BITS}) = 1 P_M + 2P_M(1-P_M) + 3P_M(1-P_M)^2 + \ldots \quad (1)$$

$$= \frac{P_M}{1-P_M} \cdot \sum_{X=1}^{\infty} X(1-P_M)^X \quad (2)$$

$$= \left(\frac{P_M}{1-P_M}\right) \cdot \frac{1-P_M}{P_M^2} = \frac{1}{P_M} \quad (3)$$

where $P_M$ is the probability of a match for an N bit pattern $P_M = P_{BM1} \cdot P_{BM2} \cdot P_{BM3} \ldots P_{BMN}$ where $P_{BMj}$ is the probability of the $j^{th}$ bit matching. Assuming independent bits with equal probability of being a "1" or a "0" or $P(0)=P(1)=0.5$, then $P_{BMj}=0.5$ for all $j$ bits. Therefore $P_M = 0.5^N$ $$E(\text{BITS PER MATCH}) = 1/0.5^N = 2^N \quad (4)$$

When a non-zero mask counter is used, then the length (C) of the counter adds to the expected number of bits $$E(\text{BITS PER MATCH}) = 2^N + C \quad (5)$$

Of interest is the standard deviation of the number of bits per match calculating the second moment, $$E((\text{No. of BITS})^2) = 1P_M + 2^2P_M(1-P_M) + \quad (6)$$

$$3^2P_M(1-P_M)^2 + \ldots$$

$$= \frac{P_M}{1-P_M} \cdot \sum_{X=1}^{\infty} X^2(1-P_M)^X \quad (7)$$

Using the following identity $$\frac{A(1+A)}{(1-A)^3} = \sum_{X=1}^{\infty} X^2 A^X \text{ for } A < 1 \quad (8)$$

$$E((\text{No. of BITS})^2) = \frac{P_M}{1-P_M} \cdot \frac{(1-P_M)(2-P_M)}{P_M^3} = \frac{2-P_M}{P_M^2} \quad (9)$$

for $P_M = .5^N$.

$$E(\text{No. of BITS}^2) = \frac{2-.5^N}{.5^{2N}} = 2^{2N}(2-.5^N) \quad (10)$$

$$\text{Variance} = E(\text{No. Bits}^2) - E(\text{No. BITS})^2 = 2^{2N}(2-.5^N) - 2^{2N} \quad (11)$$

$$= 2^{2N}(1-.5^N)$$

-continued $$\text{Standard Deviation} = 2^N(\sqrt{1-.5^N}) \approx 2^N \text{ for } N \geq 6 \quad (12)$$

Given equations (4) and (12) if we say that a variable delay of length D contains a sequence of parity bits which represent X information bits, then $$\text{Mean of } X = D \cdot (2^N + C) \quad (13)$$

$$\text{Variance of } X \approx \sqrt{D} \cdot 2^N \quad (14)$$

Given the amount of delay to be equalized, the acceptable probability of overrunning the variable delay and the available speed in the delay, equations (13) and (14) can be used to choose the variables D, N and C.

In order to provide a better understanding of the inventive principles, the parameters of a practical application will be presented. For example, the use of eight bits as the template on a 100 mHZ channel will provide an average rate for the parity output of 347 kHZ. Additionally, the interval of the masking counter is selected to be 32 bits long. In the circuit of FIG. 3, a maximum interval of 2,000 bits was chosen for the variable delay. The minimum pulse separation then would correspond to 320 nsec. On average, the content of variable delay will, in this case, correspond to 576,000 time slots of channel information which is 5.76 msec. in time. Due to the statistical nature of this arrangement, the number of time slots the variable delay can compensate for is random. Thus, it will have a normal distribution with a standard deviation of 11,449 bits. In this situation, the size of variable delay in terms of the channel rate for five standard deviations will be 518,757 time slots for virtually one hundred per cent reliability.

While particular embodiments have been shown and described, it will, of course, be understood that various modifications may be made without departing from the principles of the present invention. For example, more than one counter may be utilized so that in addition to the blocking function a maximum span length may be established by an additional counter. Accordingly, numerous and various other modifications may be utilized without departing from the scope of the invention as defined by the appended claims.

What is claimed is:

1. Apparatus for producing a parity calculation on a bit stream of data, the apparatus comprising:
   means for storing a predetermined bit pattern,
   means for comparing the predetermined bit pattern to the bit stream of data and for generating a match output signal indicating the occurrence of each match, and
   parity counting means, responsive to the match output signal and to the bit stream of data, for doing a parity count between occurrences of the match output signal and for producing a first parity signal indicative of the parity state of each parity counting calculation.

2. The apparatus as defined in claim 1 wherein the parity counting means further includes
   counting means responsive to a parity clocking signal for generating an inhibit signal to establish a minimum span interval of data on which the parity calculation is being performed, and
   gating means having two inputs and the inhibit signal being supplied to one of the inputs and the match output signal being supplied to the other one of the inputs for generating the parity clocking signal, wherein the parity clocking signal clears the parity counting means.

3. Apparatus in accordance with claim 2 further comprising:
   switching means for selecting one of two input signals, the first input signal being a predetermined number of successive bits from the bit stream and the second input signal being a signal indicative of a predetermined bit pattern, and wherein the means for storing includes
   register means connected to the output of the switching means for storing the selected input to be used as the predetermined bit pattern.

4. Apparatus for generating an error indication between two data streams comprising:
   first and second parity calculating circuitry for generating first and second parity indicating signals and first and second parity clocking signals, respectively, each of the parity calculating circuitry including
   means for storing a predetermined bit pattern,
   means for comparing the stored predetermined bit pattern to a corresponding one of the data streams and for generating a match output signal indicating the occurrence of each match, and
   parity counting means, responsive to the match output signal and to the corresponding bit stream of data, for doing a parity count between occurrences of the match output signal and for producing a parity signal indicative of the parity state of each parity counting calculation for the corresponding bit stream;
   means for controllably delaying one of the parity indicating signals relative to the other parity indicating signal so that the first and second parity indicating signals are in alignment;
   comparing means supplied with the delayed parity indicating signal and the other nondelayed parity indicating signal for generating an error signal when the parity indicating signals are out of alignment; and
   means responsive to the error signal for controlling the delaying means, wherein the occurrence of the error signal is minimized and thereby alignment of the first and second parity indicating signals is obtained.

* * * * *